(12) United States Patent
Kaise et al.

(10) Patent No.: US 7,879,630 B2
(45) Date of Patent: Feb. 1, 2011

(54) METHOD FOR MANUFACTURING A MICROLENS SUBSTRATE AND METHOD FOR MANUFACTURING A LIQUID CRYSTAL PANEL

(75) Inventors: Kikuo Kaise, Kanagawa (JP); Kazuhiro Shinoda, Miyagi (JP); Moriaki Abe, Miyagi (JP); Shoji Hasegawa, Miyagi (JP)

(73) Assignee: Sony Corporation, Tokyo (JP)

( * ) Notice: Subject to any disclaimer, the term of this patent is extended or adjusted under 35 U.S.C. 154(b) by 1004 days.

(21) Appl. No.: 11/419,275

(22) Filed: May 19, 2006

(65) Prior Publication Data

US 2006/0208284 A1    Sep. 21, 2006

Related U.S. Application Data

(63) Continuation of application No. 10/780,148, filed on Feb. 17, 2004, now Pat. No. 7,087,180.

(30) Foreign Application Priority Data

Feb. 24, 2003    (JP) .......................... P2003-045297

(51) Int. Cl.
    *H01L 21/00*    (2006.01)
(52) U.S. Cl. .............................. 438/29; 438/69; 438/70; 257/E31.127

(58) Field of Classification Search ................... 438/29, 438/69, 70; 257/E31.127
See application file for complete search history.

(56) References Cited

U.S. PATENT DOCUMENTS 5,513,289 A * 4/1996 Hosokawa et al. ............ 385/33
5,734,190 A   3/1998 Hawkins

FOREIGN PATENT DOCUMENTS

| JP | 04-036701 | 2/1992 |
| JP | 07-191209 | 7/1995 |
| JP | 2001-092365 | 4/2001 |

OTHER PUBLICATIONS

Japanese Office Action issued on Nov. 11, 2007 in connections with Japanese Patent Application No. JP 2003-045297.

* cited by examiner

*Primary Examiner*—Thien F Tran
(74) *Attorney, Agent, or Firm*—SNR Denton US LLP (57) ABSTRACT

Disclosed herein is a method for manufacturing a microlens substrate which is excellent in chemical resistance and light fastness to intense light irradiation, and is capable of forming a microlens substrate of a high accuracy of form. The method includes the steps of: forming a lens-shaped curve at a surface side of a transparent substrate; forming an inorganic material film on the transparent substrate so as to bury the curve therewith; and planarizing the surface of the inorganic material film to provide a microlens where the curve is buried with the inorganic material film.

7 Claims, 7 Drawing Sheets

METHOD FOR MANUFACTURING A MICROLENS SUBSTRATE AND METHOD FOR MANUFACTURING A LIQUID CRYSTAL PANEL

RELATED APPLICATION DATA

This application is continuation of U.S. patent application Ser. No. 10/780,148, filed Feb. 17, 2004, now U.S. Pat. No. 7,087,180 and which is incorporated herein by reference to the extent permitted by law. This application claims the benefit of priority to Japanese Patent Application No. JP2003-045297, filed Feb. 24, 2003, which also is incorporated herein by reference to the extent permitted by law.

BACKGROUND OF THE INVENTION

This invention relates to a method for manufacturing a microlens substrate wherein a plurality of microlenses are formed and arranged, and also to a method for manufacturing a liquid crystal panel using the microlens substrate.

In recent years, flat displays have shown a pronounced spread and breakthrough on the market, including plasma displays, liquid crystal direct view, large-sized screen displays, field emission displays, and organic and inorganic EL displays. These have gained a public favor as being flat and large in size and having a thin design called "Wall-hung TV", which is considered as one of factors of making a breakthrough.

On the other hand, extensive developments have been made on projectors using light bulbs such as LCD (liquid crystal display), DMD (digital mirror display), LCOS (liquid crystal on silicon) and the like. Although these cannot be made so thin as "wall-hung type " as set out hereinabove, rear projection TV is fully responsible for high image quality and low costs and has the ability of playing a role of large-sized displays. Moreover, with projectors, they have such applicability as to be arbitrarily selectable in projection frame size that is an intrinsic characteristic property thereof, like front AV projectors. In addition, they have the feature in that their portability is good as a result of the advance in miniaturization, thus ensuring outdoor use. It is thus believed that in some future day, these displays would begin to be put on the respective fields of market depending on the characteristic feature thereof.

In a high-definition liquid crystal panel (liquid crystal light bulb) for conventional liquid crystal projectors, a microlens substrate wherein a microlens is provided in every pixel is used. For the formation of the microlens substrate, a silica substrate or different types of glass substrates are employed, and application of (a) wet etching technique, (b) 2P (photopolymerization) technique and (c) dry etching technique has been reduced into practice.

Figure 7A:
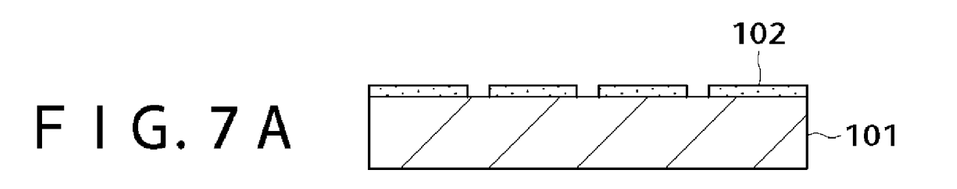
FIGS. 7A to 7E are, respectively, a sectional view illustrating the steps of a method for manufacturing a known microlens substrate.
Figure 7B:
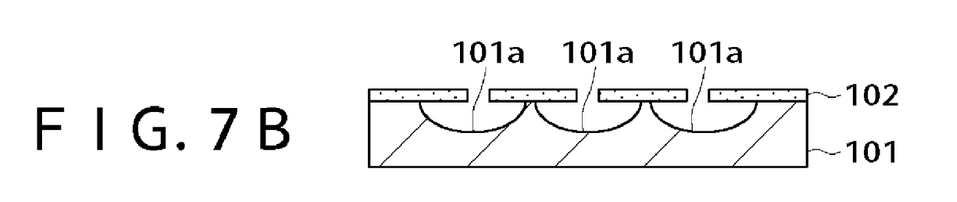
Figure 7C:
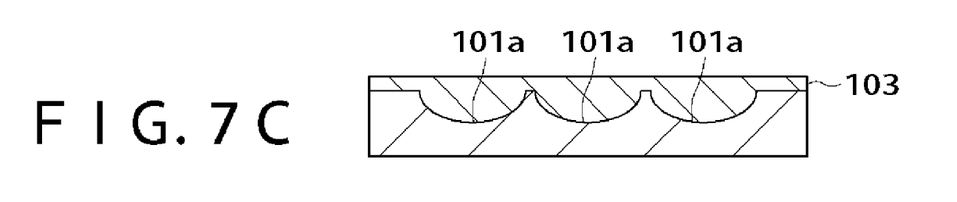
Figure 7D:
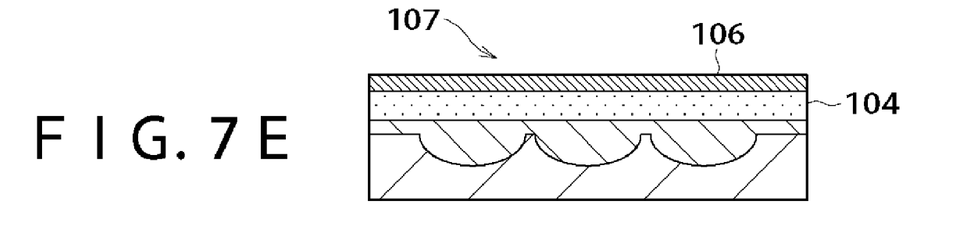
Figure 7E:
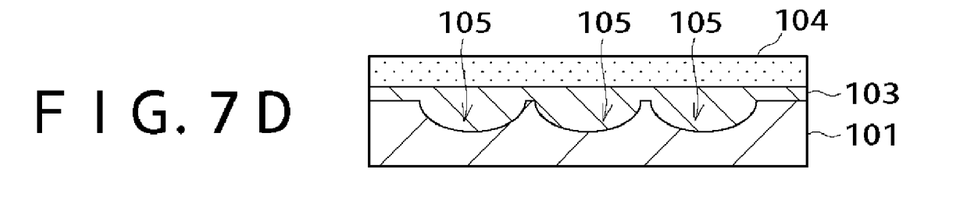

Among these techniques, the wet etching technique (a) is illustrated with reference to FIGS. 7A to 7E. Initially, as shown in FIG. 7A, a resist pattern 102 is formed on a substrate 101 made of glass or silica. Next, as shown in FIG. 7B, a lens-shaped concave curve 101a is formed in the substrate 101 by isotropic etching through the mask of the resist pattern 102 with use of a HF etchant. After removal of the resist pattern 102, a resin 103 is applied onto the substrate 101 to fill the inside of the concave curve 101a with the resin as shown in FIG. 7C. Next, as shown in FIG. 7D, a cover glass 104 is attached through the resin 103 on the substrate 101, thereby forming a microlens 105 wherein the resin 103 is filled within the concave curve 101a. Thereafter, as shown in FIG. 7E, an ITO electrode 106 is formed on the cover glass 104 to complete a microlens substrate 107. It will be noted that for the isotopic etching mask used in FIG. 7B, a material such as a metal (chromium or the like) or an impurity-containing polysilicon, which is resistant to a HF etchant, may be used.

Alternatively, another method may be used wherein a resist pattern on a substrate is thermally processed into a lens form, and the substrate is etched through a mask of the pattern to transfer a lens-shaped convex curve in the substrate (see Japanese Laid-open Patent Laid-open No. 2001-92365, particularly at [0008] to [0009] and FIG. 6).

In both methods illustrated hereinabove, the microlens is formed of a resin, and the source of lens power is based on the difference in refractive index between the resin and the substrate. Especially, in the 2P technique (b), the use of a UV-curable resin is essential therefor, and it is unavoidable to use a UV-curable resin.

The resins used for such a microlens substrate should have the following properties (1) to (6).
(1) High transmittance in a visible light region.
(2) High heat resistance (to a temperature of about 200° C.) standing use in the manufacturing process of a liquid crystal display after the formation of microlenses.
(3) Goods light fastness.
(4) Good chemical resistance, or a resistance to chemicals (alcohols, ketones, and waterproofing) in subsequent processes.
(5) High reliability such as of not causing cloudiness by the influence of high temperatures, high humidity, low temperatures and heat cycles and undergoing little change of refractive index without cracking. Optimum viscosity (of about 100 cps to 500 cps), good adhesion and adhesion strength for ensuring uniformity in thickness of a resin film.

However, only a very small number of resins which actually meet the properties (1) to (6) in practice are known. Hence, it is the usual practice to search for a resin that meets such requirements as set out above and optimally design the shape of microlens according to the refractive index depending on the type of device, with the attendant problem that the selection of material is difficult. Especially, where a resin for microlens is used as an adhesive or an adhesive resin used is of a type different from that of a microlens, the requirements other than the visible light transmittance (1) pose problems to all of actually existing liquid crystal displays.

For instance, the problem involved in improving light fastness (3) is as follows. The improvement in brightness of recent liquid crystal projectors increasingly places importance on the improvement in light fastness of a resin (i.e. an organic material) for arranging a liquid crystal panel. Especially, if light in a blue region (in the vicinity of 400 nm), which is an emission region of a lamp used for the projector, is absorbed only slightly, the resin is liable to be degraded to a non-negligible extent owing to the improvement of brightness. In ordinary projectors, light in a wavelength region of 420 nm or below is cut off by means of a UV-IR cut filter or the like. However, it has now been experienced that a slight variation in performance of UV-IR cut filters permits such a non-negligible degree of resin degradation as to occur by the action of light of the component contained within the above-mentioned wavelength region. In the worst case, the resin will undergo yellowing or browning along with an instance where the resin becomes wavy such as by a deformation stress caused during the use of a projector.

With respect to the chemical resistance (4), alcohols and ketones are used in a LCD assembling process including cleaning steps of substrate and panel. Only slight dissolution in these solvents influences a voltage retention of LCD and contributes to ion conduction, thus bringing about the degradation of LCD. Moreover, if such a resin is formed on an aligned film even in the form of a monomolecular layer, a variation in pretilt angle of liquid crystal molecules, an anchoring characteristic of liquid crystals molecules and working operation are influenced.

Further, with respect to reliability (5), resins are usually not resistant to moisture. Water molecules fundamentally degrade adhesion by diffusion in resin, and the refractive index (n=1.33) of water is generally smaller than refractive indices of resins, so that as a moistureproof test times passes, the resin refractive index changes, thereby causing the power of microlens to be degraded and the focal distance to be changed.

The requirement (6) presents problem particularly on the difference in thermal expansion between a substrate material and a resin. In general, the difference in thermal expansion is on the order of magnitude of double-digit or over.

In general, organic matters are low in refractive index, for which it is necessary to form a lens deeply for the purpose of achieving high brightness. Usually, it is more difficult to make a deep lens. When using etching or the like, uniformity and productivity are adversely influenced, and where a substrate size is increased for cost cutting, a difficulty is involved in the uniformisation of a lens shape.

SUMMARY OF THE INVENTION

It is therefore an object of the invention to provide a method for manufacturing a microlens substrate which is excellent in chemical resistance and light fastness to intense light irradiation and is capable of forming microlenses of high shape precision.

It is another object of the invention to provide a method for manufacturing a liquid crystal panel using the microlens substrate.

In order to achieve the above objects of the invention, there is provided, according to the invention, a method for manufacturing a microlens substrate, which includes the steps of forming a lens-shaped curve in a surface side of a transparent substrate, forming an inorganic material film on the transparent substrate so as to bury the curve therewith, and planarizing the surface of the inorganic material to bury the curve with the inorganic material film.

The method for manufacturing a liquid crystal panel according to the invention is characterized by including, after the formation of the microlens as set out above, forming a thin film transistor at a position corresponding to a peripheral portion of the microlens on the inorganic material film to provide a microlens substrate, providing a counter substrate in face-to-ace relation with the microlens substrate at the side where the thin film transistor has been formed, and sealedly placing a liquid crystal layer between these substrates.

According to these methods of manufacturing a microlens substrate and a liquid crystal panel, the microlens is formed by burying a lens-shaped curve formed in the transparent substrate with an inorganic material film, so that the microlens substrate can be constituted only by use of an inorganic material without use of a resin. Thus, a microlens substrate having good chemical resistance and light fastness can be obtained. In addition, the heat resistance is so improved that it becomes possible to perform steps having a thermal treatment, such as the step of forming a thin film transistor on a flattened or planarized inorganic material film. In this way, one is enabled to form a thin film transistor while registering against a microlens in high precision.

DETAILED DESCRIPTION OF THE PREFERRED EMBODIMENTS

The embodiments of the invention are described in detail with reference to the accompanying drawings. It will be noted that a method for manufacturing a microlens substrate for a liquid crystal panel with a 0.7 inch×GA (extended graphics array: 1024×768 pixels) display and a method for manufacturing a liquid crystal panel are described in this order.

Embodiment 1

Figure 1A:
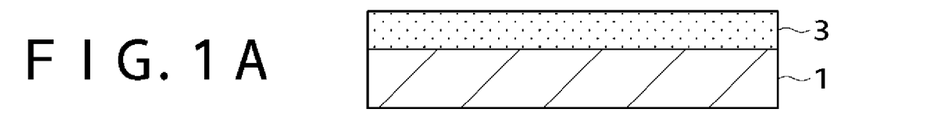
FIGS. 1A to 1G are, respectively, a sectional view illustrating a first example of a method of manufacturing a microlens substrate according to a first embodiment of the invention.
Figure 1B:
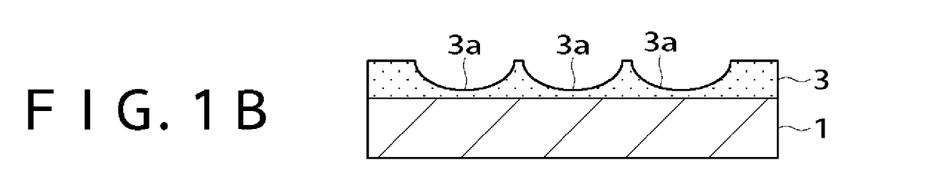

FIGS. 1A to 1B are, respectively, a sectional view illustrating a first example of a method of manufacturing a microlens substrate according to the invention. The first embodiment is illustrated with reference to these figures.

Initially, as shown in FIG. 1A, a resist film 3 is formed on a transparent substrate 1, which has, for example, a diameter of 6 inches and is made of fused silica (or Neoceram). In this case, the resist film 3 is formed in a thickness of 10 μm according to a spin coating technique.

Next, as shown in FIG. 1B, the resist film 3 is subjected to lithographic treatment at the surface side to form an array of lens-shaped concave curves which are a basic pattern of microlenses. In this embodiment, concave curves 3a are formed in the respective pixel regions of about 14 μm×14 μm created by partitioning a display region at the center of the surface side of the transparent substrate 1.

In this lithographic treatment, multiple exposure is carried out wherein a plurality of exposure masks (multiple mask) 3 is used to carry out pattern exposure to the resist film 3 successively. It is to be noted that exposure using an i-ray stepper is performed in this multiple exposure. After the multiple exposure, the resist film 3 is developed with use of a coater developer.

In the multiple exposure, there is used a multiple mask that permits, for example, an aspheric lens-shaped concave curve 3a to be formed. This lens shape is appropriately set depending on the difference of refractive index between the materials used for constituting the microlens. For instance, where a microlens formed in the following way is constituted of fused silica (refractive index n=1.46) used to form a lens-shaped concave curve and $Al_2O_3$ (refractive index n =1.58 to 1.65)

filled in the concave curve, a lens shape is so set as to have an aspheric constant k=about −0.95 to −0.8 and a focal distant f 40 to 45 μm (in air). In this condition, the lens depth is at approximately 5 to 7 μm. The number of masks in the multiple mask is at about ten.

It will be noted that after the lithographic treatment, the stepped shape of the concave curve $3a$ may be smoothened through thermal treatment.

Figure 1C:
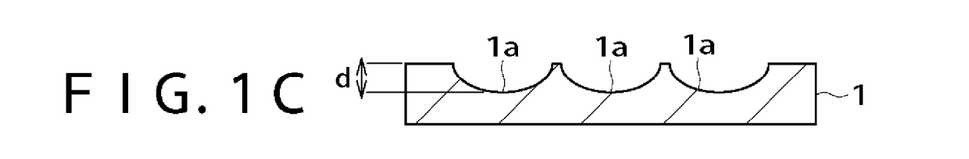

Next, as shown in FIG. 1C, the lens-shaped concave curves $3a$ formed at the surface side of the resist film are transferred from the resist film 3 to the transparent substrate 1 by dry etching. In this manner, the lens-shaped concave curves $1a$ are formed in the surface of the transparent substrate 1. This concave curve $1a$ has a lens depth d=approximately 5 to 7 μm. In this embodiment, a parallel plate RIE system is used, for example, wherein etching is carried out such that the pressure within an etching atmosphere is kept at 0.1 Pa or over and the electrode power is kept at 0.2 kW or over, and $CF_4$, $CF_3H$ or $CF_2H_2$ is used as an etching gas. It will be noted that a gas such as $SF_6$, $C_3F_8$ or the like may also be used for the etching gas. In this etching, the etching selection ratio may be set within a range of resist film 3: substrate 1=about 1:1 to 7:1.

The steps set forth hereinabove may be effected according to the multiple exposure method described, for example, in Japanese Patent Laid-open Nos. Hei 7-191209, Hei 8-219808 and the like. The pattern exposure using the above-stated lithography may be carried out by a gray mask technique in place of the multiple exposure method.

Figure 1D:
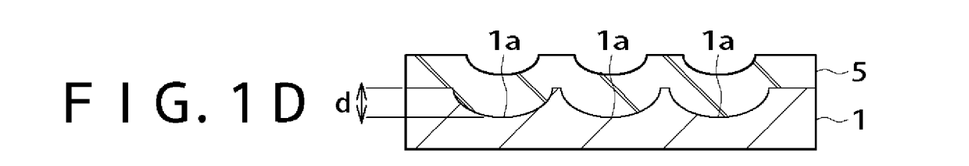

Thereafter, as shown in FIG. 1D, an inorganic material film 5 is formed on the transparent substrate 1, formed with the concave curves $1a$ thereon, in a thickness sufficient to bury the concave curve $1a$ therewith. The inorganic material film 5 is formed, for example, by using at least one of $Al_2O_3$ (refractive index n=1.62 to 1.70), $HfO_2$ (refractive index n=1.95 to 2.03), $Ta_2O_5$ (refractive index n=2.03 to 2.12), $Nb_2O_5$ (refractive index n=2.23 to 2.32) and $ZrO_2$ (refractive index n=1.98 to 2.05).

The inorganic material film 5 is formed by a vacuum deposition method wherein an electron beam is irradiated on an inorganic material to apply particles of the material on the transparent substrate 1 thereby building up and forming a film. It will be noted that for the formation of the inorganic material film 5 made of $Al_2O_3$, oxygen may be added to an atmospheric gas so as to keep the stoichiometry of $Al_2O_3$. The inorganic material film 5 may be formed by a sputtering method, a CVD method, or a MOCVD (metallo-organic chemical vapor deposition) method using TMA (trimethyl aluminium) or the like.

With the case of the lens depth (i.e. a depth of the concave curve $a$) d=approximately 5 to 7 μm as set out hereinabove, the inorganic material film 5 is formed in a thickness of about 15 μm so that the concave curve $1a$ is fully buried with the inorganic material film 5.

The inorganic material film 5 may be formed by mixing such materials as mentioned above at appropriate ratios for the purpose of controlling a refractive index as desired. If the vacuum deposition method described above is used, an electron beam is irradiated on a plurality of materials, respectively, thereby depositing the plurality of materials on the transparent substrate 1 simultaneously. For instance, where it is intended to from an inorganic material film 5 having a refractive index n=about 1.80, $A_2O_3$ and $HfO_2$ are placed in different crucibles within a vacuum deposition chamber and are, respectively, irradiated with an electron beam, thereby causing $Al_2O_3$ and $HfO_2$ to be deposited on the surface of the transparent substrate 1 simultaneously. When the applied power of the electron beam irradiated on the respective materials is appropriately controlled, the amounts of the deposited materials can be controlled, with a refractive index being optimized.

Figure 1E:
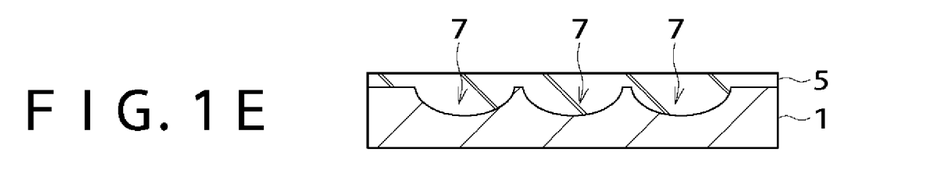

Subsequently, as shown in FIG. 1E, the inorganic material film 5 is planarized to form a microlens 7 wherein the inorganic material film 5 is buried in the concave curved $1a$ of the substrate 1. For example, abrasion is executed to planarize the inorganic material film 5, in this case. Where the inorganic material film is formed of $Al_2O_3$, cerium oxide ($CeO_2$) is used as an abrasive. In this way, the inorganic material film 5 is planarized on the surface thereof, and the inorganic material film 5 is polished to such an extent that the film thickness on the planarized portion of the transparent substrate 1 is at about 3 to 5 μm. It will be noted that after completion of the polishing, the polished surface should be cleaned.

Figure 1F:
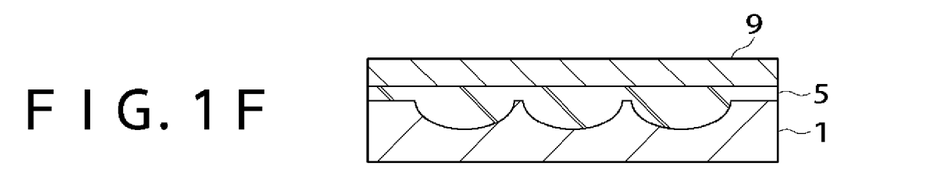

Next, as shown in FIG. 1F, a cover film 9 is formed on the planarized inorganic material film 5. The cover film 9 should preferably be formed of a material which has substantially the same coefficient of thermal expansion as the transparent substrate 1. It will be noted that the thickness of the cover film 9 is so arbitrarily set as to be necessary for performance on combination with the thickness of the inorganic insulating film 5.

In this embodiment, the cover film 9 made of $SiO_2$ is formed in a thickness of about 19 μm by a sputtering method, for example. The sputtering conditions in this case includes an inner pressure in a film-forming atmosphere of 0.1 to 0.6 Pa, a substrate temperature of 100° C. to 350° C. and a sputtering gas of Ar and $O_2$. It Will be noted that the formation of the inorganic material film 5 made of $SiO_2$ may be carried out by a CVD method or a vacuum deposition method. In addition, a SiN film is thinly formed by a plasma CVD method as the cover film 9 so that the stress involved therein is more positively controlled. More particularly, the formation of a SiN film by a plasma CVD method allows a wider range of control of film stress by a two frequency method than in the case of a $SiO_2$ film.

Figure 1G:
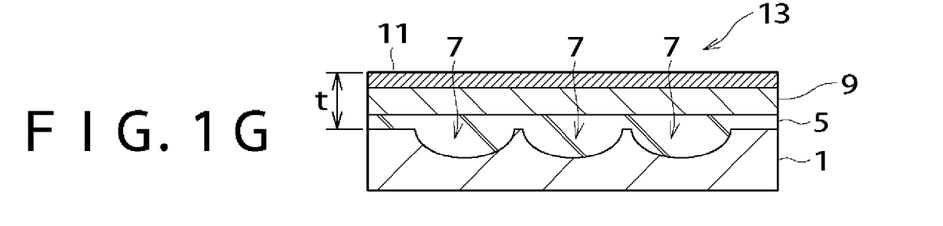

Next, as shown in FIG. 1G, a transparent electrode film 11 is formed on the cover film 9. In this embodiment, a transparent electrode film 11 made of ITO (indium tin oxide) is formed in a thickness of about 140 nm by a sputtering method. In this manner, the total optical thickness t of the inorganic material film 5, cover film 9 and transparent electrode film 11 formed on the planarized portion of the transparent substrate 1 is such that t=about 18 μm (a value calculated in air).

According to the procedure set forth hereinabove, a microlens substrate 13 is obtained wherein a plurality of microlenses 7 are formed in array on the surface of the transparent substrate 1.

Where a liquid crystal panel using the thus obtained microlens substrate 13 is formed, an alignment film is formed on the transparent electrode film 11. On the other hand, there are provided a pixel electrode and an ordinary TFT substrate wherein the surface side provided with a thin film transistor (hereinafter referred to simply as TFT) for driving the pixel electrode is covered with an alignment film. The alignment film-formed faces of the microlens substrate 13 and the TFT substrate are placed in face-to-face relation with each other, between which a crystal liquid layer is filled and sealed thereby forming a liquid crystal panel.

According to the manufacturing method of the first embodiment illustrated hereinabove, the concave curves la formed in the transparent substrate 1 made of fused silica, glass or the like are, respectively, buried with the inorganic material film 5 to form microlenses 7. Thus, a microlens substrate 13 constituted of an inorganic material alone can be obtained without use of a resin. This permits a microlens substrate 13 having excellent chemical resistance and light fastness to be obtained without causing many troubles ascribed to the use of resin. In the liquid crystal panel using such a microlens substrate 13, because any resin is used for the microlens substrate 13, cross contamination with a resin during a processing procedure can be prevented. In the liquid crystal panel using such a microlens substrate, the liquid crystal layer is prevented from pollution with a resin. Thus, the influence of a resin on the liquid crystal layer can be perfectly excluded, making it possible to obtain a liquid crystal panel having good display characteristics.

Further, since any resin is not used, discrepancies ascribed to the difference in coefficient of thermal expansion between the resin and a substrate can be avoided. Additionally, when using a resin, a lens depth has been set largely in view of the difference in refractive index from the transparent substrate. The use of an inorganic material film that allows selection of a material having a large refractive index enables one to make a small lens depth, facilitating easy formation of a lens-shaped curve. This leads to improved uniformity of a plurality curves. From the foregoing, it becomes possible to design a large-sized microlens substrate 13.

As having stated hereinbefore, the light fastness of the microlens substrate 13 can be improved. When a liquid crystal panel using the microlens substrate 13 is set in a liquid crystal projector for use as a light bulb so as to increase the quantity of light from a lamp of the liquid crystal projector, thus enabling one to achieve higher brightness. This results in a lower gain of a screen, with the possibility that a wide viewing angle can be improved.

Embodiment 2

A second example of a method for manufacturing a microlens substrate according to the invention is illustrated with reference to FIGS. 2A and 2B which are, respectively, a sectional process view.

Figure 2A:
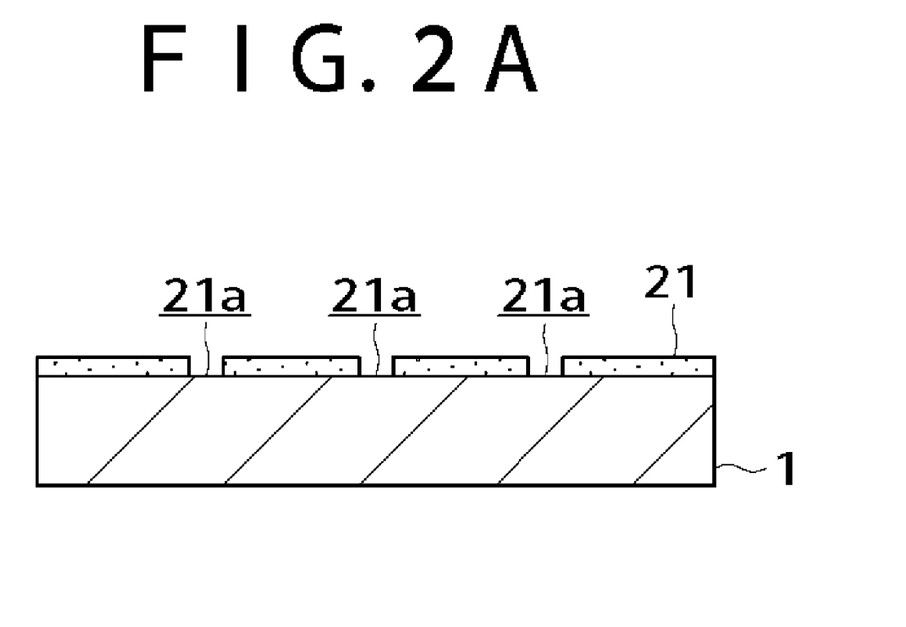
FIGS. 2A and 2B are, respectively, a sectional view illustrating a second example of a method of manufacturing a microlens substrate according to a second embodiment of the invention.

Initially, as shown in FIG. 2A, a resist pattern 21 is formed on a transparent substrate 1 similar to that used in the first embodiment by a lithographic technique. This resist pattern 21 has a hole 21a at the center of a lens-shaped concave curve to be formed, which is a basic pattern of a microlens.

Figure 2B:
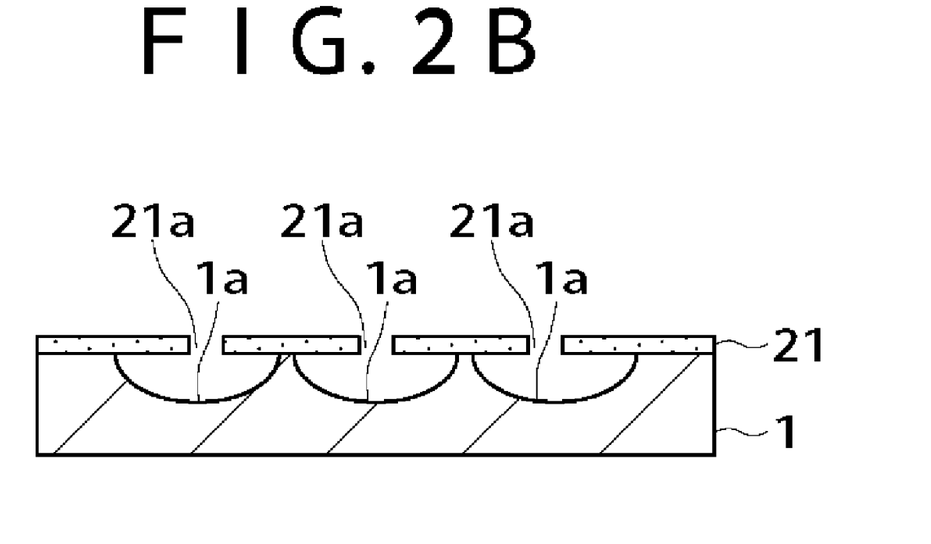

Next, as shown in FIG. 2B, the transparent substrate 1 is isotropically etched through a mask of the resist pattern 21. This allows the isotropic etching to proceed around the hole 21a of the resist pattern 21, and concave curves 1a are formed in array within the respective pixel regions of a size of about 14 μm×14 μm formed by partitioning a display region at the center of the surface side of the transparent substrate 1. The respective concave curves 1a formed in this way are spherical in shape. After completion of the etching, the resist pattern 21 is removed.

It will be noted that he mask (mask pattern) used for the isotropic etching for the transparent substrate 1 should not be construed as limiting to the resist pattern 21. This mask pattern may be one which is made of a metal film obtained by pattern etching through a mask of the resist pattern or is made of a material such as impurity-containing polysilicon. More particularly, the pattern is not critical so far as it is resistant to an etchant used for the isotropic etching.

After the steps stated hereinabove, a microlens substrate 13 can be obtained by carrying out the procedures as illustrated in the first embodiment with reference to FIGS. 1A to 1G. Using this microlens substrate 13, a liquid crystal panel can be formed in the same manner as illustrated in the first embodiment.

In the manufacturing method of the second embodiment illustrated hereinabove, the microlens 7 is formed by burying the lens-shaped concave curve 1a formed in the transparent substrate 1 made of fused silica, glass or the like with the inorganic material film 5, so that similar effects as in the first embodiment can be obtained.

Embodiment 3

Next, a method for manufacturing a microlens substrate according to a third embodiment of the invention is illustrated with reference to FIGS. 3A to 3D which are, respectively, a sectional process view. It will be noted that these sectional process views corresponding to enlarged views of an essential part of FIGS. 1A to 1G and 2A to 2B.

Figure 3A:
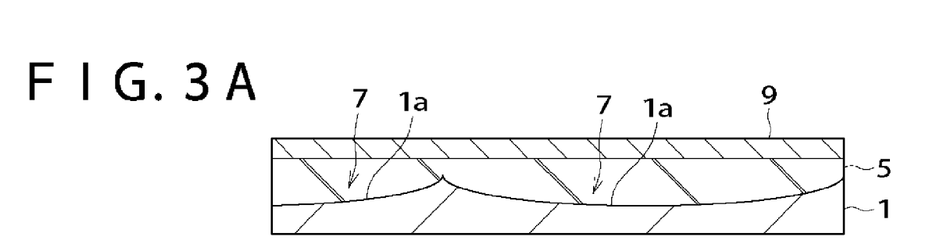
FIGS. 3A to 3D are, respectively, a sectional view illustrating a third example of a method of manufacturing a microlens substrate according to a third embodiment of the invention.

Initially, the steps illustrated with reference to FIGS. 1A to 1F in the first embodiment are, for example, carried out to form a microlens 7 wherein a concave curve 1a of a transparent substrate 1 is buried with an inorganic material film 5 as shown in FIG. 3A, and further to form a cover film 9. It will be noted that the procedure up to and including this step may be carried out by application of the procedure of the second embodiment.

Figure 3B:
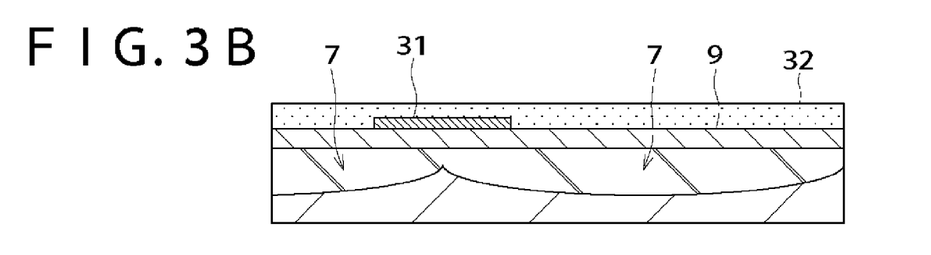

Next, as shown in FIG. 3B, a light-shielding film pattern 31 is formed on the cover film 9. This light-shielding film pattern 31 is disposed at a position surrounding individual microlenses 7 or along the peripheral edge of the respective pixels, thus being placed in coincidence with the wiring positions of a gate wiring of TFT and a signal wiring which are described hereinafter. Such a light-shielding film pattern 31 is formed of a layer of WSi or a transition metal such as Ti, W, Ta, Cr or the like by a sputtering method, followed by patterning. Alternatively, the pattern may be formed by applying the method described in Japanese Patent No. 3231757 and patterning a layer made of polycide. It is to be noted that the thickness of the light-shielding film pattern 31 is, for example, at about 200 nm.

Next, a layer insulating film 32 is formed on the cover film 9 so that the light-shielding film pattern 31 is in a buried stated. To this end, the layer insulating film 32 made of $SiO_2$ is formed in a thickness of about 600 nm, for example, by an AP (atmospheric pressure)-CVD method. It will be noted that for a subsequent TFT process, this layer insulating film 32 may be planarized by a CMP method after the formation of the layer insulating film 32.

Figure 3C:
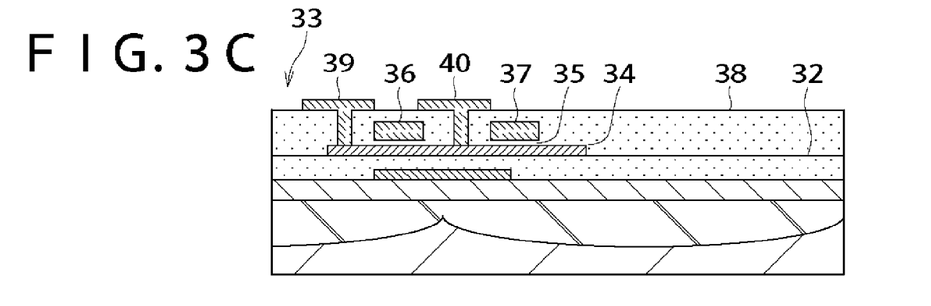

Next, as shown in FIG. 3C, a TFT circuit 33 is formed on the layer insulating film 32. In this case, a semiconductive thin film 34 made of polysilicon is first formed on the layer insulating film 32 in a thickness of about 75 nm, for example, by an LP (low pressure)-CVD method. Next, Si ions are implanted into the semiconductive thin film 34 at about 2E15 $cm^{-2}$ according to an ion implantation method to render the film amorphous, followed by thermal treatment at 600° C. for about 24 hours to permit solid phase growth.

It will be noted that for the formation of the polycrystalline semiconductive thin film 34, ordinary techniques such as a high temperature polysilicon process wherein a substrate temperature reaches about 1000° C., a low temperature polysilicon process using an exciter laser annealing procedure (substrate temperature: 450° C. to 600° C.). With respect to the low temperature polysilicon process, the process reported by Katzuhide Yoshinaga et al., in "AO. 9" XGA Low Temperature POLY-Si TFT LCLV with stacked Storage Capacitor, SID 02 Digest, p. 1013-1015 can be applied.

Next, the thus polycrystallized semiconductive thin film 34 is subjected to patterning, followed by oxidization within an oxidizing furnace at about 1000° C. to grow an about 750 nm thick oxide film 35 as a surface layer of the semiconductive thin film 34.

Next, B+ ions are introduced into a TFT portion of the semiconductive thin film 34 and As+ ions are introduced into a capacitor portion, both according to an ion implantation method. Thereafter, a 300 nm to 400 nm thick gate electrode 36 and an upper electrode 37 of the capacitor are, respectively, formed over the semiconductive thin film 34 through the oxide film 35. The gate electrode 36 and the upper electrode 37 are, respectively, formed according to a method described, for example, in Japanese Patent No. 2993665. Thereafter, an impurity is introduced according to an ion implantation method using the gate electrode 36 as a mask so as to from source -drain regions of the TFT.

Next, a layer insulating film 38 made of PSG (with a P concentration of about 2 to 4 wt %) is formed, in a thickness of about 600 nm, over the layer insulating film 32 so as to cover the gate electrode 36 and the upper electrode 37. Subsequently, a connection hole arriving at the semiconductive thin film 34 is formed in the layer insulating film 38, and a signal wire 39 and a lead wire 40 for connection with the semiconductive thin film 34 via this connection hole are, respectively, formed. The signal wire 39 and the lead wire 40 are formed by patterning a 400 to 600 nm thick Al—Si (Si content of 0.9%) film. In this way, the TFT circuit 33 wherein TFT and the capacitor have been wired is formed in the display region at the center of the surface side of the transparent substrate 1. This TFT circuit 33 is so arranged as to be at a position surrounding a plurality of pixel regions dividing the display region.

It will be noted that the formation of the TFT circuit 33 is not limited to the above-stated procedure, and procedures set forth in Japanese Patent Nos. 3231757 and 2993665, Japanese Patent Laid-open Nos. 2000-142089 and 2001-330856, and the like may be applied.

Simultaneously with the step of forming the TFT circuit 33, a drive circuit provided with a p-channel TFT may be formed at a peripheral region surrounding the display region at the surface side of the transparent substrate 1, thereby providing a CMOS arrangement. In addition, the TFT may be formed as having a LDD structure or a double gate structure.

Figure 3D:
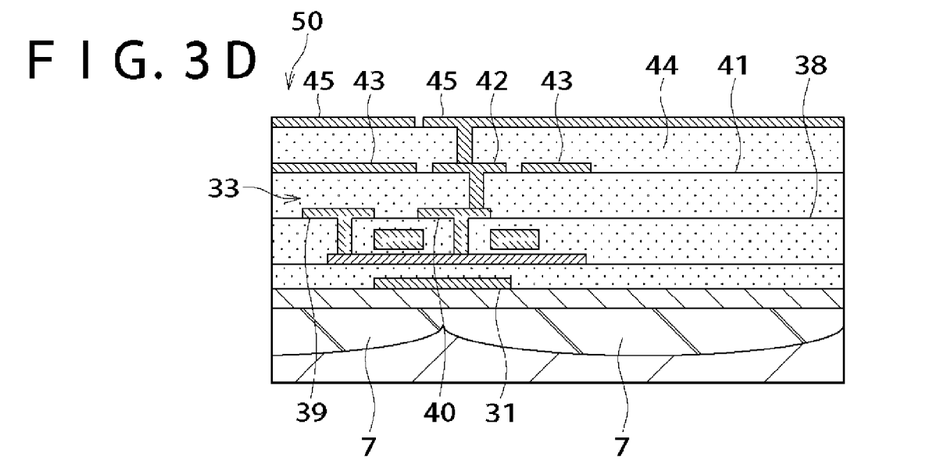

After the formation of the TFT circuit 33 in a manner as described hereinabove, a layer insulating film 41 made of $SiO_2$ is formed on the layer insulating film 38 by an AP-CVD method in a thickness of about 400 nm so as to cover the signal wire 39 and the lead wire 40, as shown in FIG. 3D. Thereafter, a connection hole is formed in the layer insulating film 41 so as to arrive at the lead wire 40, and a wiring pattern 42 and a light-shielding film pattern 43 that are connected to the lead wire 40 via the connection hole are, respectively, formed. These wiring pattern 42 and light-shielding film pattern 43 are formed by subjecting a light-shielding film of a metal, such as To, W, Ta or the like, to pattern etching.

Furthermore, an upper insulating film 44 is formed over the layer insulating film 41 so as to cover the wiring pattern 42 and the light-shielding film pattern 43. Thereafter, a connection hole arriving at the wiring pattern 42 is formed in the upper insulating film 44, a pixel electrode 45 connected to the wiring pattern 42 via the connection hole is formed. This pixel electrode 45 is formed by subjecting a transparent electrode material film such as, for example, ITO or the like to pattern etching.

In this way, a microlens substrate 50 having the TFT circuit 33 for driving the pixel electrode 45 is obtained. This microlens substrate 50 serves also as a TFT substrate.

Where a liquid crystal panel is formed using the microlens substrate 50 having such an arrangement as described hereinabove, an alignment film is formed so as to cover the pixel electrode 45 therewith although not shown herein.

On the other hand, the microlens substrate 13 is made according to the procedure illustrated in the first embodiment with reference to FIG. 1 or the procedure illustrate in the second embodiment with reference to FIGS. 1 and 2, an alignment film (not shown) may be formed on the transparent electrode film 11 of the microlens substrate 13. It will be noted that this microlens substrate 13 may be a conventional one using a resin.

Figure 4:
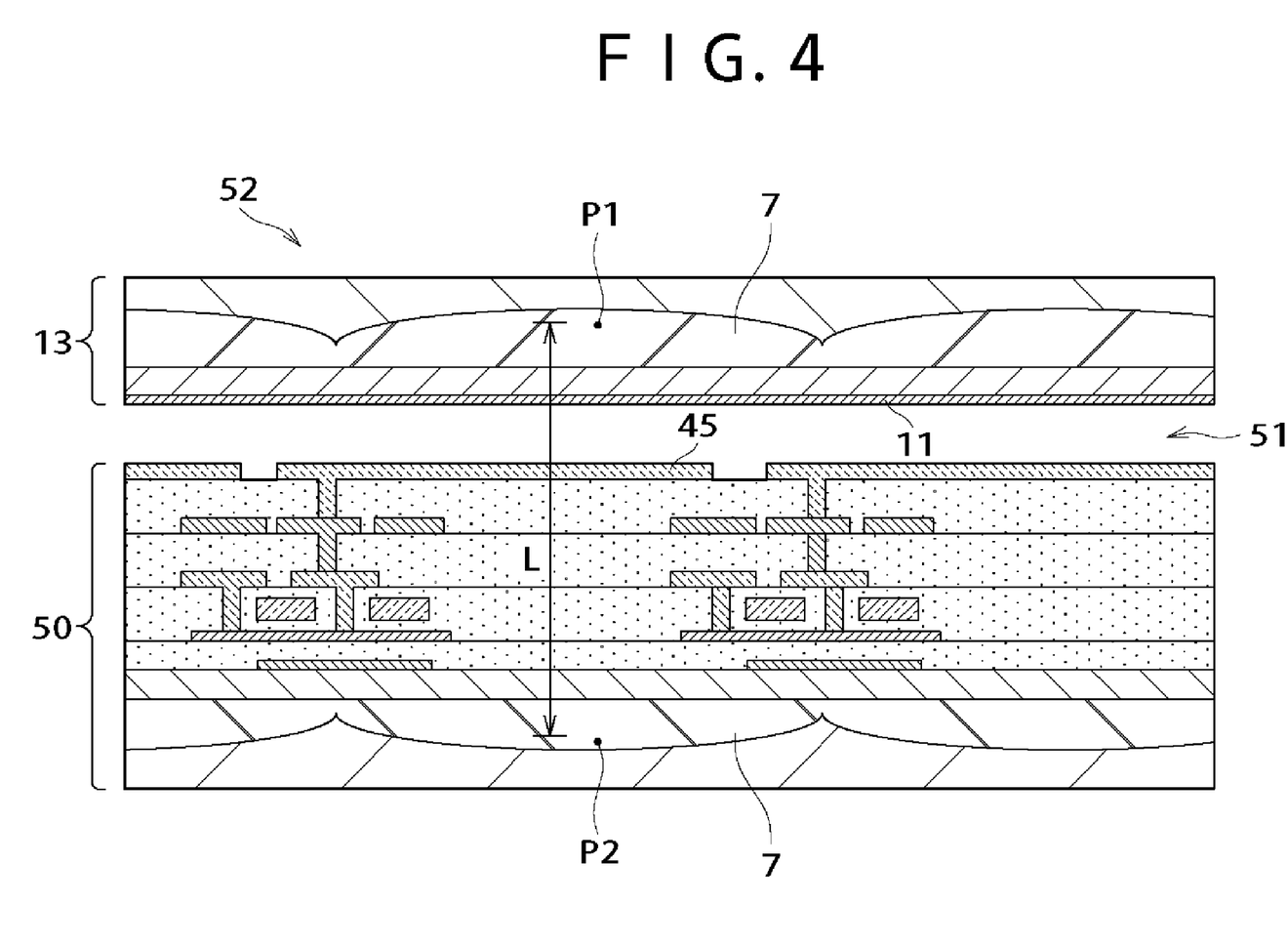
FIG. 4 is a sectional view showing an arrangement of a liquid crystal panel according to a fourth embodiment of the invention.

Next, as shown in FIG. 4, the microlens substrate 50 and the microlens substrate 13 are so arranged that the alignment film-formed surface (pixel electrode 45-formed surface) of the substrate 50 and the alignment film-formed surface (transparent electrode 11-formed surface) are in face-to-face relation with each other. In the respective pixel regions, the microlens substrates 13, 50 are facing each other such that a distance L between principal points P1 and P2 of the microlens substrates 13, 50 is substantially in coincidence with a focal distance of the microlens 7 at the microlens substrate 50 side serving also as the TFT substrate.

A liquid crystal layer 51 is sealedly filled between the microlens substrate 13, 50 arranged in such a way as set forth above.

Accordingly the manufacturing method of the third embodiment illustrated with reference to FIGS. 3A to 3D, the microlens 7 can be improved in resistance by forming the microlens 7 in a manner as illustrated in the first embodiment. This enables one to obtain the microlens substrate 50 serving also as the TFT substrate, without the step of bonding the microlens substrate to the TFT substrate, wherein the TFT circuit 33 undergoing a thermal treating step is formed on the inorganic material film 5 constituting the microlens 7 and which has the TFT circuit for driving the pixel electrode 45.

More particularly, it becomes possible to form the microlens 7, followed by continuous formation of the TFT circuit 33 and the pixel electrode 45, all on the same substrate, so that while registering with the previously formed microlens 7, the TFT circuit 33 can be formed. The registration is carried out in high precision by using a stepper or a mirror projector, and thus the resulting microlens substrate 50 is improved in precision of registration between the microlens 7 and the TFT circuit 33 and pixel electrode 45 and also acts as a TFT substrate of high quality.

Since the microlens substrate 50 is obtained without bonding the two substrates together, the number of transparent substrates can be reduced, thus leading to the saving of substrate costs.

The liquid crystal panel 52 using the microlens substrate 50 illustrated with reference to FIG. 4 has the two microlenses 7 arranged in such a state as stated hereinbefore and sandwiching the liquid crystal layer 51 in individual pixel regions, so that a field function is provided and an angle of divergence of an incident ray into the liquid crystal panel.

Moreover, as stated hereinabove, the microlens 7 at the side of the microlens substrate 50 serving as a TFT substrate is disposed in high precision relative to the TFT circuit 33 and the pixel electrode 45, the field function can be very efficiently developed. The variation in quantity of an output ray that depends on the degree of registration with the microlens can be suppressed, with an improved yield.

Further, in the manufacturing method illustrated with reference to FIGS. 3A to 3D, such an arrangement has been described wherein after the formation of the cover film 9, one layer of the light-shielding film pattern 31 is formed thereon.

Figure 5:
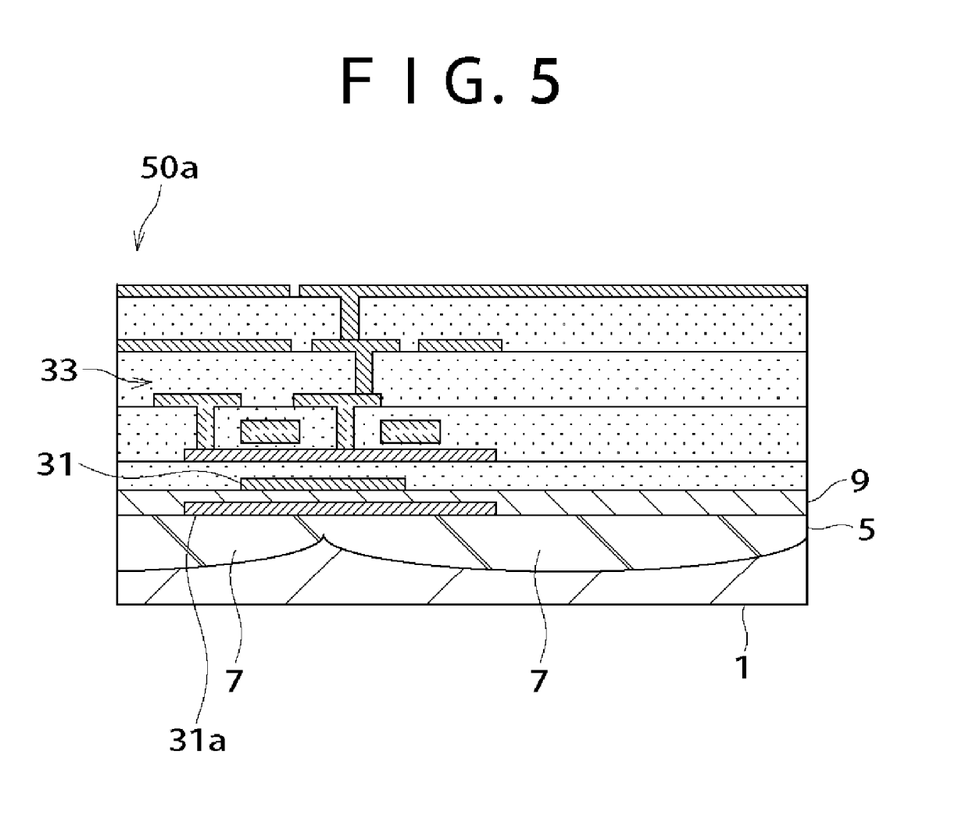
FIG. 5 is a sectional view showing a modification according to the third embodiment.

In this connection, however, according to the invention, the inorganic insulation film 5 is formed such that the lens-shaped concave curve 1a is buried with its surface being planarized thereby obtaining the microlens 7. In this condition, it becomes possible to form the light-shielding film pattern directly on the planarized inorganic insulating film 5. Accordingly, as shown in FIG. 5, two layers 31, 31a of the light-shielding film pattern may be provided as sandwiching the cover film therebetween.

Where such two light-shielding film patterns 31, 31a are formed, the inorganic material film 5 is planarized, after which the first-layer light-shielding film pattern 31a is formed and the cover film 9 is formed so as to cover the pattern therewith. After planarization of the cover film 9 on the surface thereof, if necessary, the light-shielding film pattern 31 (second layer) is formed in a manner as illustrated in the above-stated third embodiment, followed by subsequent steps. It will be noted that the first-layer light-shielding film pattern 31a is formed in the same manner as with the above-stated light-shielding film pattern 31.

In this way, the two layers of the light-shielding film patterns 31, 31a can be provided, so that the incidence of light to the TFT circuit 33 from the back side of the transparent substrate 1 can be efficiently prevented, and the generation of an optical leakage current can be prevented along with disadvantages involved in image quality, such as flickers, a lowering of contrast and the like, being avoided. In addition, heat generation in the liquid crystal panel arranged by use of the microlens substrate 50a can be released from the two layers of the light-shielding film patterns 51, 51a, and thus the working temperature of the liquid crystal panel can be further reduced, thereby permitting reliability to be improved. Moreover, because light is shielded by means of both layers of the light-shielding film patterns 31, 31a, the margin for the film thickness with which the degree of light-shielding in the respective layers is determined is enlarged, with the effect of enlarging the light-shielding process margin.

Especially, in a liquid crystal projector using the liquid crystal panel constituted by use of the microlens substrate 50a, the direction of emission of display light is at the side of the transparent substrate 1 of the microlens substrate 50a (see, for example, Douglas Hansen et al., "The Display Applications and Physics f the Proflux™ Wire Grid Polarizer", SID Digest 2002, p. 730 to p. 733). It will be noted that the liquid crystal panel using the microlens substrate 50a has such an arrangement wherein the microlens substrate 50 of the liquid crystal panel 52 illustrated with reference to FIG. 4 is replaced, in a similar arrangement, by the microlens substrate 50a.

Figure 6:
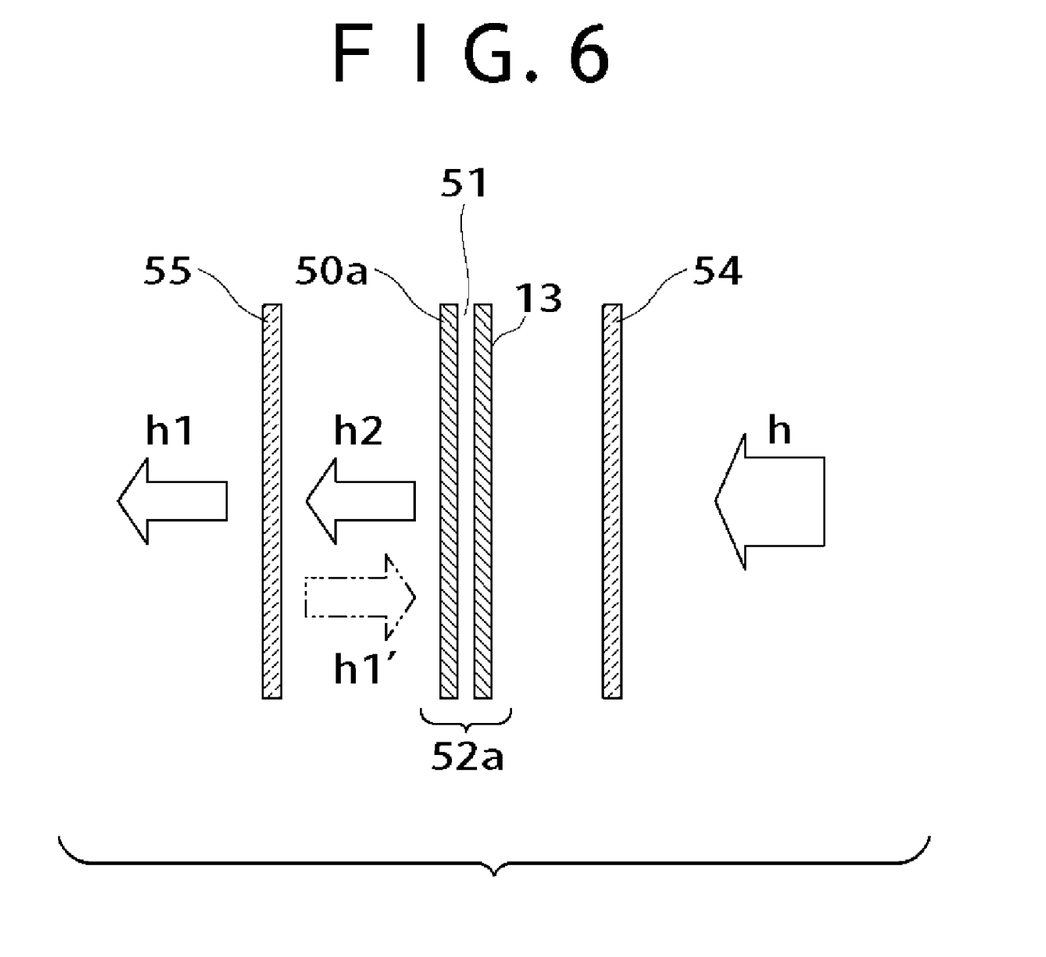
FIG. 6 is an illustrative view showing an essential part o a liquid crystal projector using the liquid crystal panel of the third embodiment.

More particularly, as shown in FIG. 6, in the liquid crystal projector, the liquid crystal panel 52a, in which the liquid crystal layer 51 is sandwiched between the microlens substrate 50a and the microlens substrate 13 disposed in face-to-face relation with the former one, is placed between two polarizing plates 54, 55. Of lamp rays h incident from a polarizing plate 54 of the facing side microlens substrate 13, light h1 emitted after passage through the polarizing plate 54, the liquid crystal panel 52a and a polarizing plate 55 serves as a display light ray. However, in case where the polarizing plate 55 at the emission side is made of an inorganic polarizing plate and a black display is effected, light h2 is reflected at the polarizing plate 55 toward the liquid crystal panel 52a side and enters the liquid crystal panel 52a as returned light h1'. To prevent the returned light h1' from the transparent substrate (1) side of the microlens substrate 50a from entering the TFT circuit 33 is very important for preventing the generation of an optical leakage current and the disadvantages in image quality such as flickers, a lowering of contrast and the like.

Accordingly, as illustrated with reference to FIG. 5, using the microlens substrate 50 serving also as the TFT substrate wherein the light-shielding film patterns 31, 31a having a double-layered structure, such returned light h1' can be reliably prevented from entering the TFT circuit 33, thus enabling one to improve the image quality of the liquid crystal projector.

It will be noted that in the microlens substrate serving also as a TFT circuit, such an arrangement may be provided wherein the first-layer light-shielding pattern 31a shown in FIG. 5 alone is formed and the second-layer light-shielding film pattern 31 is not formed.

In the respective microlens substrates serving as the TFT substrates described above, where a semiconductive thin film for the TFT circuit is formed according to a low temperature process, it is possible to use the microlens substrate as a light diffusion layer of a direct view panel.

In the first to third embodiments stated hereinbefore, an arrangement wherein the transparent electrode film 11 and the TFT circuit 33 are formed on the cover film has been illustrated. However, the inorganic material film 5 left on a planarized portion of the transparent substrate 1 obtained after the planarization is set as thick without formation of the cover film 9. The transparent electrode film 11 may be formed directly on the planarized inorganic insulating film 5. In this case, the step of forming the cover film 9 is omitted, thus leading to improved productivity.

As stated hereinbefore, according to a method for manufacturing a microlens substrate of the invention, a lens-shaped curve formed in a transparent substrate is planarized by burying with an inorganic material film, thereby forming a microlens. Thus, it becomes possible to obtain a microlens substrate which is excellent in chemical resistance and light fastness and this provided with microlenses of a high accuracy of form. Moreover, according to a manufacturing method of a liquid crystal panel of the invention, using the microlens substrate, a liquid crystal panel having long-term reliability and display accuracy can be obtained.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method for manufacturing a microlens substrate comprising the steps of:
    forming a lens-shaped curve at a surface side of a transparent substrate;
    forming an inorganic material film on said transparent substrate by vacuum deposition where an electron beam irradiates the inorganic material to apply particles of the material to the transparent substrate so as to bury said curve therewith; and
    planarizing a surface of said inorganic material film to provide a microlens where said curve is buried with said inorganic material film,
    forming a cover film over the inorganic material film,
    wherein,
        the cover film has substantially the same coefficient of thermal expansion as that of the transparent substrate.

2. The method according to claim 1, wherein the step of forming a lens-shaped curve at a surface side of a transparent substrate comprises:

forming a mask pattern on said transparent substrate; and forming said lens-shaped curve at the surface side of said transparent substrate by isotropic etching from said mask pattern.

3. The method according to claim 1, wherein said inorganic material film is formed of at least one member selected from the group consisting of $Al_2O_3$, $HfO_2$, $Ta_2O_5$, $Nb_2O_5$ and $ZrO_2$.

4. The method according to claim 1, wherein after the step of planarizing the surface of said inorganic material film to provide a microlens where said curve is buried with said inorganic material film, a cover film having a given thickness is formed on said inorganic material film.

5. The method according to claim 1, wherein after the step of planarizing the surface of said inorganic material film to provide a microlens where said curve is buried with said inorganic material film, a thin film transistor is formed on said inorganic material film at a position corresponding to a peripheral portion of said microlens.

6. The method according to claim 5, wherein after the step of planarizing the surface of said inorganic material film to provide a microlens where said curve is buried with said inorganic material film, but prior to the formation of said thin film transistor, a light-shielding pattern is provided on said inorganic material film at the position corresponding to a peripheral portion of said microlens.

7. A method for manufacturing a microlens substrate comprising the steps of:
  (a) forming a lens-shaped curve at a surface side of a transparent substrate by
    (i) forming a resist film on said transparent substrate,
    (ii) forming the lens-shaped curve at a surface side of said resist film, and
    (iii) transferring said lens shape from said resist film to the surface side of said transparent substrate by dry etching;
  (b) forming an inorganic material film on said transparent substrate so as to bury said lens-shaped curve therewith; and
  (c) planarizing the surface of said inorganic material film to provide a microlens where said curve is buried with said inorganic material film.

\* \* \* \* \*